Jan. 16, 1951 E. WILDHABER 2,538,546
UNIVERSAL JOINT
Filed Oct. 25, 1947 3 Sheets-Sheet 1

INVENTOR.
ERNEST WILDHABER
BY
ATTORNEY

Jan. 16, 1951 E. WILDHABER 2,538,546
UNIVERSAL JOINT
Filed Oct. 25, 1947 3 Sheets-Sheet 2

INVENTOR.
ERNEST WILDHABER
BY
ATTORNEY

Jan. 16, 1951  E. WILDHABER  2,538,546
UNIVERSAL JOINT
Filed Oct. 25, 1947  3 Sheets-Sheet 3

INVENTOR.
ERNEST WILDHABER
BY
ATTORNEY

Patented Jan. 16, 1951

2,538,546

UNITED STATES PATENT OFFICE 2,538,546

UNIVERSAL JOINT

Ernest Wildhaber, Brighton, N. Y.

Application October 25, 1947, Serial No. 782,078

10 Claims. (Cl. 64—9)

The present invention relates to universal joints and particularly to universal joints of the uniform motion type, and to methods and apparatus for producing such joints.

Universal joints of the uniform motion type have the advantage over conventional type universal joints that they transmit motion between connected shafts at any shaft angle without producing torsional vibrations. Moreover, gears driven through them operate more quietly than gears driven through conventional universal joints because they eliminate the possibility of the joint setting up impulses which cause gear noise at resonant conditions. Known types of uniform motion universal joints are, however, complicated in construction, difficult to make accurately, and more costly than ordinary type universal joints. They have had, therefore, only restricted use.

One object of the present invention is to provide a uniform motion universal joint which can be made accurately at low cost.

A related object is to provide a uniform motion universal joint which can be made at a cost low enough to compete on a price basis even with ordinary universal joints.

Another object of the invention is to provide a low cost, high performance universal joint designed for moderate shaft angularities and particularly suited for use in the rear axle drives of automotive vehicles.

A further object of the invention is to provide a simple, fast method of producing the end members of universal joints having the above-described features and advantages.

Still other objects of the invention are to provide cutting and grinding tools for quickly and accurately producing the end members of the novel joints of the present invention.

Other objects of the invention will be apparent hereinafter from the specification and from the recital of the appended claims.

Figure 8:
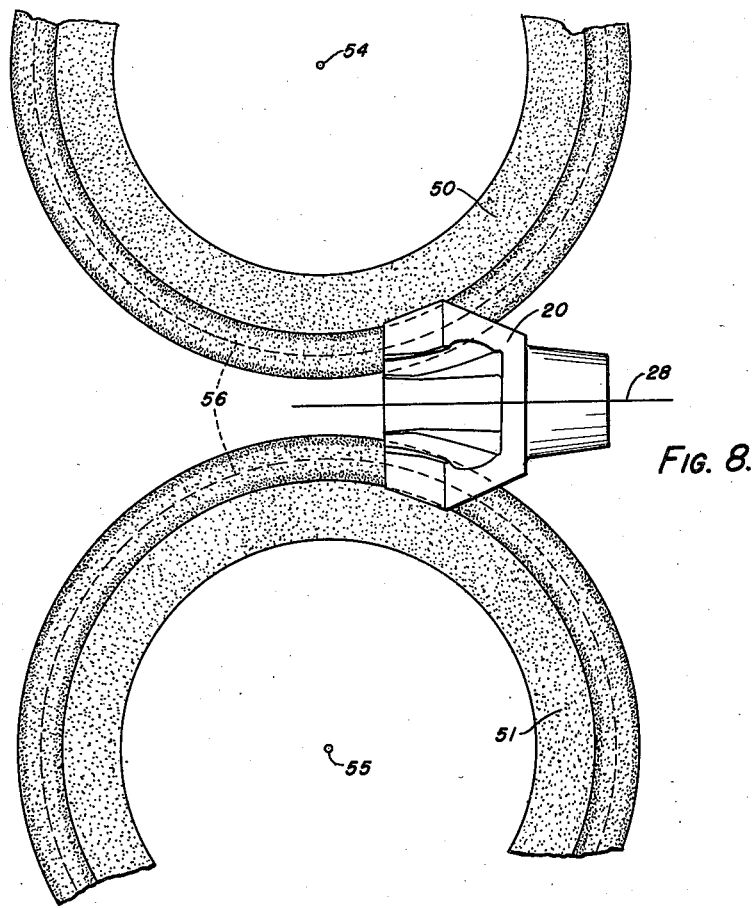
Figure 9:
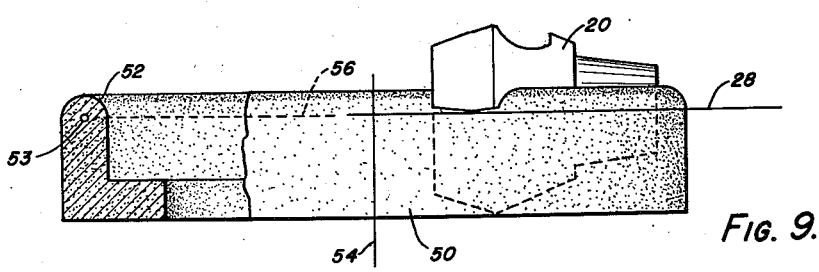
Figure 10:
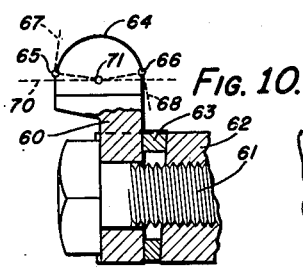
Figure 11:
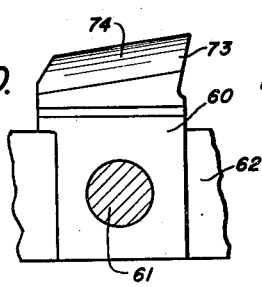

Figs. 8 and 9 are front and side views illustrating diagrammatically how the grooves may be produced in an end member of a joint according to the present invention; and Figs. 10 and 11 are a fragmentary sectional view and a fragmentary side elevation, respectively, of a face-mill cutter made according to one embodiment of this invention for cutting grooves in an end member of a joint constructed according to the invention.

Referring first to the embodiment of the invention shown in Figs. 1 to 6 inclusive, 20 and 21 denote, respectively, the two end members, and 22 the balls of the joint. The two end members are identical and one only need, therefore, be described in detail. Corresponding parts of the other member will be designated by the primed reference numerals.

In this embodiment of the invention, each end member has a hub portion and three prongs, which project forward from said hub portion. The hub portion of end member 20 is designated 23 and its prongs are denoted at 24. Each prong 24 has grooves 25 in its opposite sides. These grooves are of circular arcuate shape in cross-section as clearly shown in Fig. 3, and are of generally circular arcuate shape lengthwise as shown in Fig. 1.

The chief novel feature of my joint is the shape of the grooves 25, 25'. The longitudinal center lines 26, 26' of these grooves are circular arcs whose centers are offset from the axes 28, 28' of the end members. They are arcs of circles, such as circle 32 (Fig. 1), which extend wholly to one side of the axes 28 or 28' of rotation of the end members. They are curves which are concave towards the outside, that is, away from the axes of the end members. These curves are inclined generally to the axes 28 and 28'. The center lines of the grooves at opposite sides of each prong 24, 24' converge toward the fronts 33, 33' of the prongs, but they do not intersect axes 28, 28'. They have a distance therefrom larger than the radius of balls 22.

Figure 1:
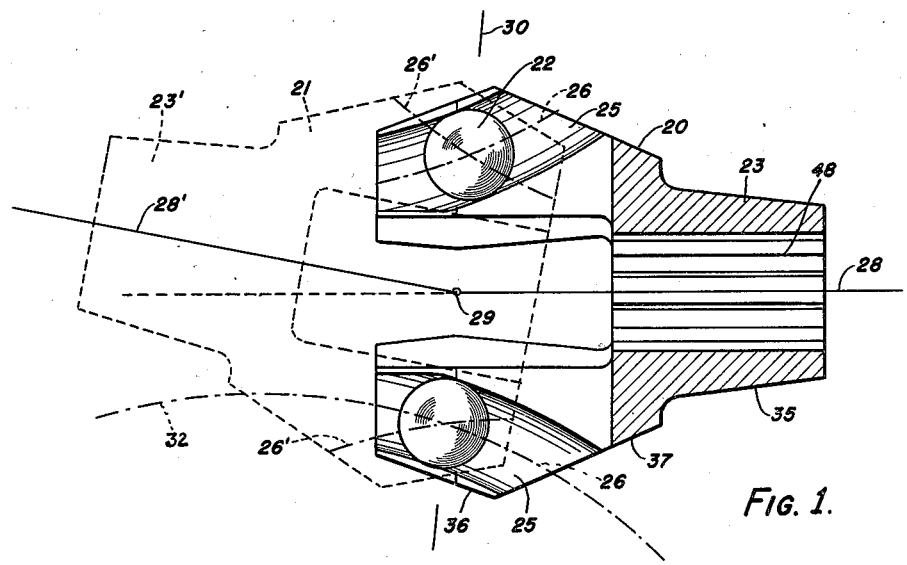
Fig. 1 is an axial section showing one end member of a joint made according to one embodiment of this invention and showing in dotted lines the mating end member and showing the balls which connect the end members.
Figure 2:
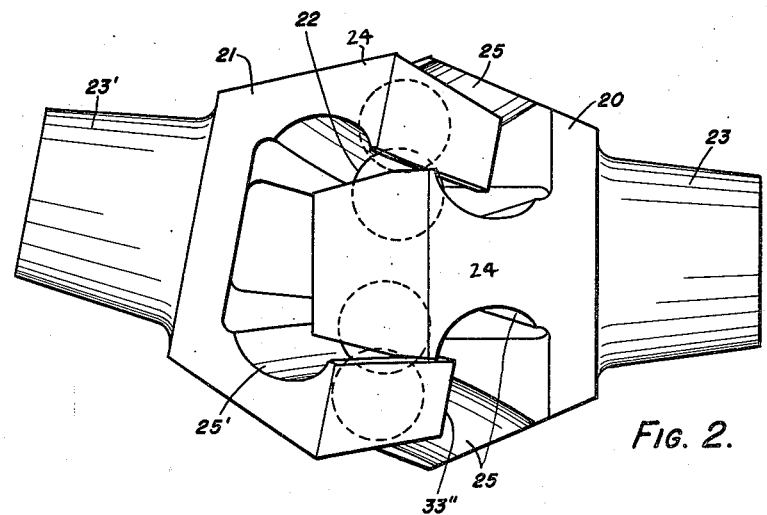
Fig. 2 is a side elevation of the joint, the shaft angularity being the same as in Fig. 1.
Figure 3:
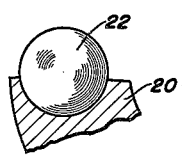
Fig. 3 is a fragmentary sectional view taken transversely of one of the grooves of one of the end members of the joint.
Figure 4:
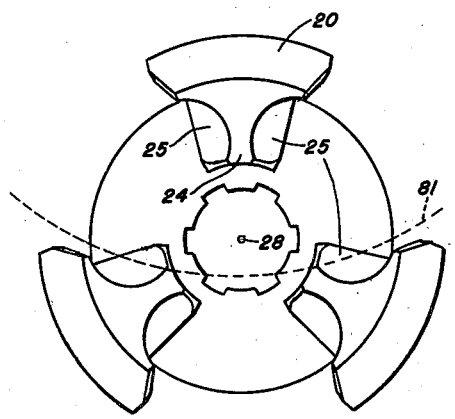
Fig. 4 is an end elevation of one of the end members of the joint looking at the front thereof.
Figure 5:
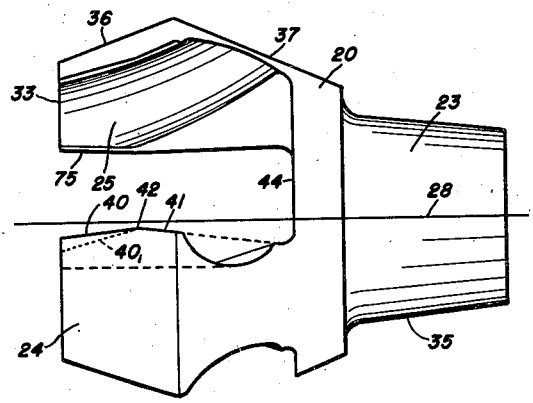
Fig. 5 is a side elevation of this end member taken at right angles to the view of Fig. 2.

In Figs. 1 and 2, the two end members are shown disposed angularly to one another and their axes 28 and 28' intersect in a point 29.

Figure 6:
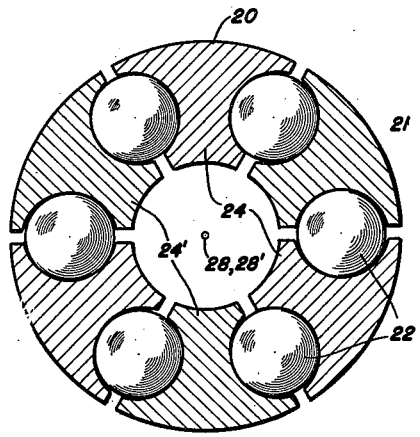
Fig. 6 is a transverse sectional view through the two end members of the joint when they are in axial alignment.

In Fig. 6, the two end members are axially aligned.

The longitudinal center lines 26 or 26' of the grooves of the end members lie in axial planes which are equi-spaced about the axis of the respective end member and which are disposed on opposite sides of the prongs 24, 24'. Adjacent grooves 25, 25' of the two end members form pairs and between each of these pairs of grooves there is a ball 22. These balls engage in the grooves and transmit torque between the end members. Each ball is adapted to roll and slide lengthwise in its pair of grooves 25, 25' as the joint revolves, so that the center of the ball will always be maintained at the point of intersection of the longitudinal center lines 26, 26' of the pair of grooves.

The axial planes of the center lines 26, 26' and these center lines themselves intersect in the plane 30, Fig. 1, which passes through the intersection point 29 of the axes 28, 28' and bisects the angle between these axes. The axial planes and the center lines 26, 26' are in other words symmetrical with respect to plane 30; and one can be considered as though it were the image of the other reflected in a mirror surface extending along plane 30. This is true for all turning positions of the joint. It is seen, then, that the joint is bound to transmit uniform motion at any shaft angularity within the design limits. When the joint turns on its axes 28, 28' at any given shaft angularity, the centers of the balls 22 remain and move in plane 30.

The end members may be of any suitable external shape. In the instance shown, the hub portion 23 of end member 20 has an external conical surface 35, and the end member is formed also with two other external conical surfaces 36 and 37. The apex of conical surface 36 is at the front; the apices of conical surfaces 37 and 35 are at the rear. Surface 37 may be made cylindrical, if desired, especially when the end members are forged. Surface 35 may also be made cylindrical when intended to serve as a seat for the inner race of an antifriction bearing.

Each side surface of a prong 24 comprises two planes 40 and 41 (Fig. 5) which intersect at an angle less than 180° and in a line 42. This line lies in a plane perpendicular to axis 28 and passing through point 29. Point 29 is the anticipated average intersection point of axes 28, 28'. The joint is capable, however, of moderate axial displacement of the end members within design limits. The two end members may be approached axially or separated without loss of uniformity of the transmitted motion.

Figure 7:
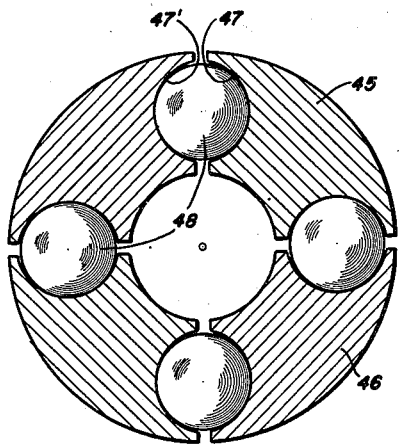
Fig. 7 is a corresponding transverse sectional view through the two end members of a joint made according to a modification of the invention.

The end members may be made either with even or uneven numbers of prongs. In the joint shown in Figs. 1 to 6 inclusive, the end members 20 and 21 have an uneven number of prongs, three. Fig. 7 illustrates an embodiment of the invention in which the two end members 45 and 46 have an even number of prongs, namely, two. These prongs have grooves 47 and 47', respectively, in their opposite sides, and the end members are again connected by balls 48 which engage in the opposed grooves at opposite sides of the prongs of the two end members.

For making an end member of a joint the blank of the end member 20, 21, 45 or 46 may be first turned or milled to cut its outside surface. It is then bored and its splines 48 broached.

On joints with an uneven number of prongs, the surfaces 40 at opposite sides of different prongs may lie in the same plane, and likewise the surfaces 41 at opposite sides of different prongs. Thus opposite sides of different prongs can be broached simultaneously. The plane surfaced bottoms 44 of the spaces between the prongs may be cut in this same broaching operation. The sides of a three-pronged end member may thus be completed in three broaching passes.

For the cutting of the grooves 25, 25', face-mill cutters are preferably used. The grooves can also be ground with annular wheels, generally similar to the cutters. The operation is substantially the same whether the grooves be cut or ground.

Figs. 8 and 9 illustrate a grinding operation. Here annular grinding wheels are employed that have active profiles 52 which are circular arcs that match the circular arc profiles of grooves 25, 25'. The center of arc 52 is at 53. Preferably two wheels 50 and 51 are used so as to be able to grind simultaneously grooves at opposite sides of the prongs of the work.

The two wheels are positioned with their axes 54 and 55 parallel and perpendicular to the axis 28 of the work, and with the outermost parts of their tips in the same plane. The wheels are rotated on their respective axes in engagement with the work while the work is held stationary on its axis and while relative depthwise feed in the direction of axes 54 and 55 is effected between the wheels and work. This feed movement is preferably imparted to the work. After two grooves at opposite sides of different prongs of the work have been completed, the work may be withdrawn rapidly from engagement with the wheels and the work may be indexed. Then the cycle may be begun anew to grind two other grooves of the work.

The shape of the grooves is applied in the end position of depthwise feed. A groove surface is the counterpart of the active surface of the tool. In the end position of depthwise feed, the center line 56 of the circular profiles 52 of each grinding wheel coincides with the center line 26 of the groove being ground and lies in a plane containing the axis 28 of the work.

A relatively simple machine may be used for carrying out this process. It may be provided with a pair of vertical slides arranged one above the other. A tool spindle may be journaled in each slide, and provision may be made for rotating the tool spindles and for adjusting them axially to compensate for wheel wear. The work may be mounted upon a separate slide which can be fed in the direction of the axes 54 and 55 and which can be withdrawn in this same direction for mounting and removing the work. Provision should also be made for automatically indexing the work.

For cutting, the same general operation may be performed as for grinding, two face-mill cutters of circular arcuate active profile shape being simply substituted for the two annular grinding wheels. The cutters are similar in profile shape to the grinding wheels. Instead of having an infinite number of cutting edges, as have the grinding wheels, however, they have a plurality of cutting blades arranged circularly about their respective axes and projecting beyond their side faces in the general direction of their axes.

Figs. 10 and 11 show a blade 60 of one form of face-mill cutter which may be employed. The blade may be secured in conventional manner by a bolt 61 in one of the slots of the cutter head 62. The blade is recessed so that the head of the bolt does not project beyond it. This is to avoid interference with the prongs of the end member. A wedge 63 may be interposed between blade and cutter head for radial adjustment of the blade according to conventional practice.

The cutting profile 64 of the cutter is a circular arc which extends between end points 65, 66. The cutting profile of a face-mill cutter is the profile of an axial section of the surface of revolution described by the cutting edges of the cutter as it rotates on its axis. If the blades are sharpened so that their cutting edges lie in axial planes of the cutter, the cutting profile of the cutter is the profile of a cutting edge of the cutter.

In the cutter shown the tangents 67, 68 at the end points of the cutting profile 64 include an angle with each other which is less than 180° but which is larger than a right angle and amounts to at least 135°. This angle is also the angle of circular arc 64. In Fig. 10, a line 70 has been drawn through profile center 71 at right angles to the cutter axis. The end points 65, 66 of the cutting profile are equi-distant from said line and therefore have the same position axially of the cutter. Both points 65 and 66 are closer to the top of the cutting profile than profile center 71. They are axially in front of point 71. In the preferred construction, the radius of the cutting profile 64 is less than one-tenth of the distance of the profile center 71 from the axis of the cutter 62. This will cause the cutter to produce grooves whose profile curvature is suitably proportioned to their lengthwise curvature.

What is true of the cutter profile is true also of the grinding wheel profile. The end points of the profile have been omitted from Fig. 9 because of the reduced scale of that figure.

The blades 69 of the cutter are preferably sharpened by grinding back their cutting faces 73 which may be planes. The blades may be ground with a front rake or "hook" as is common practice on gear cutters. The tips and sides of the blades are relieved back of their cutting faces to provide clearance back of the cutting edges of the blades. The blades are preferably relieved axially so that the relieved surfaces, such as side surface 74, are helical surfaces of constant lead coaxial with the cutter.

The cutter may be constructed with blades all around its periphery and a groove of the work may then be cut in a plurality of revolutions of the cutter and the cutter will then be withdrawn periodically from engagement with the work to permit indexing the work, or the cutter may be made with blades arranged only part-way around its periphery with a gap between its last and first blades, and the work may then be indexed on each revolution of the cutter when the gap in the cutter is abreast of the work. In the latter case, the blades of the cutter are preferably made of progressively increasing height to cut progressively deeper into the work as the cutter revolves, and cut a groove without depthwise feed of the cutter into the work. Such a cutter can be made of large diameter and provided with both roughing and finishing blades so that a groove can be completed in a revolution of the cutter. The diameter of the cutter employed is subject to little restriction since both end members 20 and 21 are alike.

In both embodiments of the invention illustrated, I have used comparatively large balls. Also I have shown grooves as deep as practically possible. This design would result in sharp edges at the inside front ends of the grooves as at 75, Fig. 5. These edges should be chamfered. Instead of chamfering by hand, these edges can be removed or chamfered with a face-mill cutter in a separate operation from the cutting of the grooves. The axis 80 of this cutter (Fig. 4) is parallel to the axis 28 of the work. The cutter cuts with its outside edges which sweep in a circular path 81 and effect the desired chamfer.

The sharp edges 75 and the chamfer can be avoided by increasing the inclination of plane 40 (Fig. 5) so that this surface has an inclination as denoted at $40_1$. The front end of line $40_1$ is then as low as the chamfer would be so that a land runs all along the groove 25. It is also possible to cut off the hump at 42 by using a single plane in place of the two planes 40, 41. This plane will connect the front end of plane side $40_1$ with the rear end of plane side 41. It may be parallel to axis 28. With this construction the end member has grooves of constant but reduced depth, the depth being equal to the depth of groove 25 at its rear end. A reduction in groove depth is acceptable when the universal joint is to connect shafts at moderate angles. The reduced depth of groove simplifies the shape and the manufacturing process and eliminates chamfering.

Joints may be made according to the present invention which will compete in price with ordinary non-uniform motion joints because with the method of producing the end members of my joint, the grooves in opposite sides of a prong may be cut or ground simultaneously and fast with two face-mill cutters or annular grinding wheels. The joints are, moreover, simple in construction.

Since a grinding wheel has an infinite number of cutting edges, the terms "cutters" and "cutting" as used hereinafter in the claims are intended to include grinding wheels and grinding.

The invention has been illustrated in the drawings in connection with an embodiment which is designed for a maximum shaft angularity of ten degrees. Such angularity is sufficient for most automotive applications. Larger angularities can be achieved if desired by using prongs which are more cut out on the sides. This may require end members of larger diameter for a given ball diameter. For larger maximum shaft angularities, as, for instance, for thirty degree angularity, the taper of the grooves, that is, their convergence is preferably increased.

It will be understood, therefore, that while the invention has been described in connection with particular embodiments thereof, it is capable of further modification, and that this application is intended to cover any variations, uses, or adaptations of the invention following, in general, the principles of the invention and including such departures from the present disclosure as come within known or customary practice in the art to which the invention relates and as may be applied to the essential features hereinbefore set forth and as fall within the scope of the invention or the limits of the appended claims.

Having thus described my invention, what I claim is:

1. A universal joint comprising two end members, each of which is provided with grooves arranged about its axis, the opposite ends of said grooves being at different radial distances from said axis, and balls engaging in said grooves and connecting said end members, each of said grooves being of arcuate profile shape and concavely curved longitudinally away from the axis of the end member.

2. A universal joint comprising two end members, each of which is provided with grooves arranged about its axis, the opposite ends of said grooves being at different radial distances from said axis, and balls engaging in said grooves and connecting said end members, each of said grooves being of arcuate profile shape and concavely curved longitudinally away from the axis of the end member, the center line of each groove lying in a plane containing the axis of its end member.

3. A universal joint comprising two end members, each of which is provided with grooves arranged about its axis, the opposite ends of said grooves being at different radial distances from said axis, and balls engaging in said grooves and connecting said end members, each of said grooves being of circular arcuate profile shape and being curved longitudinally away from the axis of the end member along a concave circular arc, the center line of each groove lying in a plane containing the axis of its end member.

4. A universal joint comprising two end members, which are provided with oppositely inclined grooves, and balls engaging in said grooves and connecting said end members, each of said grooves having its opposite ends at different radial distances from the axis of its end member and being of circular arcuate profile shape and being curved longitudinally along an arc of a circle whose plane passes through the axis of its end member and which lies wholly at one side of said axis without crossing it.

5. A universal joint comprising two end members, each of which is provided with a plurality of grooves, and balls engaging in said grooves and connecting said end members, the grooves of each end member converging toward the front of the end member, and the grooves of the two end members being oppositely inclined, each of said grooves being concavely curved longitudinally away from the axis of its end member.

6. A universal joint comprising two end members, each of which is provided with a plurality of grooves, and balls of equal size engaging in said grooves and connecting said end members, the grooves of each end member converging toward the front of the end member, and the grooves of the two end members being oppositely inclined, the center line of each groove being an arc of a circle whose plane passes through the axis of its end member and which lies wholly at one side of said axis at a distance therefrom greater than the radius of said balls.

7. A universal joint comprising two end members, each of which is provided with a plurality of prongs, each of said prongs having longitudinally curved grooves at its opposite sides which are of arcuate profile shape and which are open at both ends, the prongs of one end member interfitting with the prongs of the other end member, and balls engaging in the opposed grooves of the prongs to transmit torque between the end members, the grooves in the two end members being oppositely inclined and each groove being concavely curved longitudinally away from the axis of its end member and having its opposite ends at different radial distances from the axis of its end member.

8. A universal joint comprising two end members, each of which is provided with a plurality of prongs, each of said prongs having longitudinally curved grooves at its opposite sides which are open at both ends and which converge toward the front of the prong, said grooves being of arcuate profile shape and concavely curved longitudinally away from the axes of their respective end members, the grooves in the two end members being oppositely inclined, the prongs of one end member interfitting with prongs of the other end member, and balls engaging in the opposed grooves of the prongs to transmit torque between the end members.

9. A universal joint comprising two end members, each of which is provided with a plurality of prongs, each of said prongs having grooves at its opposite sides which are open at both ends and which are curved longitudinally along circular arcs which converge toward the front of the prong and which are closer to the axis of the end member at the front of the prong than at the rear thereof, said grooves being of arcuate profile shape and concavely curved longitudinally away from the axes of their respective end members, the grooves in the two end members being oppositely inclined, the prongs of one end member interfitting with the prongs of the other end member, and balls engaging in the opposed grooves of the prongs to transmit torque between the end members.

10. A universal joint comprising two end members, each of which has three prongs, each of said prongs having grooves of circular arcuate profile shape formed in its opposite sides, which are open at both ends and which are curved longitudinally away from the axis of the end member along a concave circular arc, the prongs of one member interfitting with the prongs of the other end member and the opposed grooves in the prongs of the two end members forming pairs, and a ball engaging in the two grooves of each pair, the center line of each groove being an arc of a circle whose plane passes through the axis of its end member and which extends wholly at one side of said axis at a distance therefrom larger than the radius of the ball.

ERNEST WILDHABER.

REFERENCES CITED

The following references are of record in the file of this patent:

UNITED STATES PATENTS

| Number | Name | Date |
| --- | --- | --- |
| 1,627,932 | Scott | May 10, 1927 |
| 1,769,762 | Weiss | July 1, 1930 |
| 2,156,106 | Bill | Apr. 25, 1939 |
| 2,344,956 | Aber | Mar. 28, 1944 |
| 2,362,364 | Duservoir | Nov. 7, 1944 |
| 2,367,221 | Kraus | Jan. 16, 1945 |
| 2,382,509 | Seiter | Aug. 14, 1945 |